United States Patent [19]

Yukio et al.

[11] Patent Number: 4,894,950
[45] Date of Patent: Jan. 23, 1990

[54] TREE SUPPORT-CONSTRUCTION METHOD

[75] Inventors: Yukio Kida, Osaka; Haruto Kobayashi, Tokyo, both of Japan

[73] Assignee: Toho Perlite Kabushiki Kaisha, Tokyo, Japan

[21] Appl. No.: 230,889

[22] Filed: Aug. 11, 1988

[30] Foreign Application Priority Data

Oct. 1, 1986 [JP] Japan ................ 61-235387

[51] Int. Cl.⁴ .............................. A01G 17/04
[52] U.S. Cl. ....................................... 47/42
[58] Field of Search ................ 47/42, 23; 52/162

[56] References Cited

U.S. PATENT DOCUMENTS

| | | | |
|---|---|---|---|
| 1,273,890 | 7/1918 | Loseth | 52/162 |
| 1,600,020 | 9/1926 | Tomkinson | 52/162 |
| 2,007,606 | 7/1935 | Jencick | 47/42 |
| 2,501,255 | 3/1950 | Bell | 47/42 |
| 3,785,100 | 1/1974 | Watanabe | 52/162 |
| 4,318,246 | 3/1982 | Jungbluth et al. | 47/42 |

FOREIGN PATENT DOCUMENTS

62-195225 8/1987 Japan .

Primary Examiner—David A. Scherbel
Assistant Examiner—Michele Van Patten
Attorney, Agent, or Firm—Birch, Stewart Kolasch & Birch

[57] ABSTRACT

A method for positioning and supporting a tree having a tree stem and a rootball is disclosed wherein a hole is formed in a ground surface. Anchors are positioned within the hole. Block fragments are positioned around the tree stem. A securing member is disposed around the block fragments and the tree stem for securing the block fragments to the tree stem. The rootball is positioned within the hole. A tension member is connected to the securing member and the anchors. A tightening member is connected to the tension member for adjusting the tension of the tension member for retaining and tree within the hole. Thereafter, the rootball positioned within the hole is buried.

8 Claims, 6 Drawing Sheets

TREE SUPPORT-CONSTRUCTION METHOD

BACKGROUND OF THE INVENTION

1. Field of the Invention

The present invention relates to a tree support construction method for positioning and supporting a tree to be planted artificially in parks, adjacent paved areas, international exposition sites and the like.

2. Description of Background Art

The conventional prior art method most similar to the present invention is applicant's tree support construction method disclosed in Japanese laid-open patent Application No. 61-195225.

Figure 1:
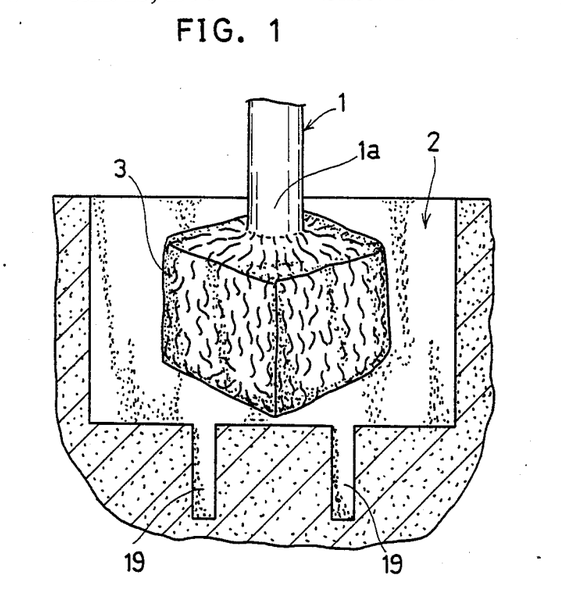
FIG. 1 is a schematic perspective view illustrating a tree rootball positioned in a ground hole.
Figure 8A:
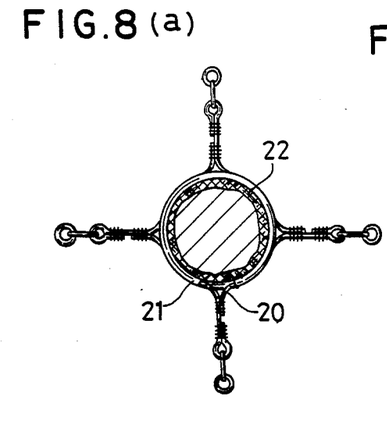
FIG. 8(a) is a schematic plan view of a conventional embodiment.
Figure 8B:
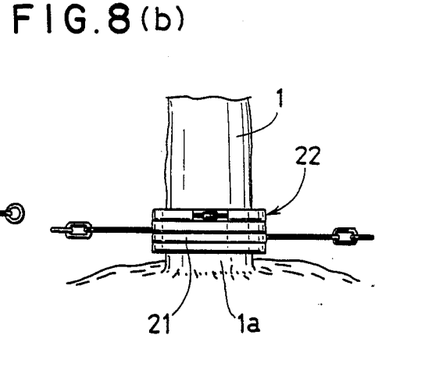
FIG. 8(b) is a schematic side view of the embodiment illustrated in FIG. 8(a)
Figure 8C:
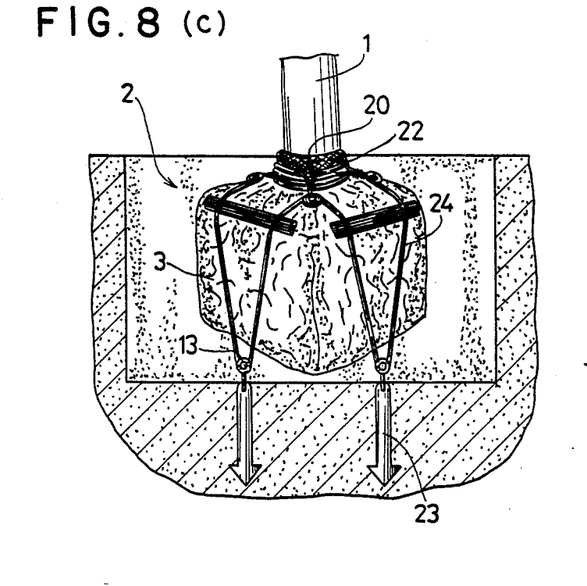
FIG. 8(c) is a schematic perspective view thereof.

As illustrated in FIG. 1, the prior method teaches first placing the rootball 3 of a tree 1 into a hole 2 preformed in the ground. Thereafter, as illustrated in FIGS. 8(a) and 8(b), the trunk of the tree is encircled separately with four supporters 22 composed of a root wire 20 disposed within a rubber hose 21. Thereafter, as illustrated in FIGS. 8(a), a tension wire 24 is connected to the root wire 20 portion of each supporter 22, respectively, and to the anchors 23 which are positioned in the hole 2. The tension wire 24 is tightened around the circumference of rootball 3 to support the tree 1 with the opposing tension in the wire 24.

However, several problems are associated with use of the conventional method. First, each root wire 20 is wound about the tree trunk only once. Thus, each root wire 20 applies force to the tree 1 from only one direction by the tension of the tension wire 24. Thus, it is difficult to balance the attaching force applied to the tree by a single root wire to maintain the tree in an upright and supported position. Therefore, to maintain the desired force balance, it is necessary to use four separate supporters 22 from four individual and opposing directions. This makes the planting operation very difficult.

Further, if supporters 22 cover the tree roots 1a to hold the roots 1a with pressure, the root wire 20 in the supporter 22 will directly bite into the root 1a, causing a problem wherein the tree may be damaged and the bark may not be permitted to be exposed to the atmosphere.

OBJECTS AND SUMMARY OF THE INVENTION

The present invention aims at solving all the problems mentioned above by providing a good operation efficiency for a root wire mounting. The securing press attaching force, prevention of dispersion of the press attaching force, prevention of careless biting of the root wire into the tree and the very easy tensioning and loosening of the tension wire with one adjustment, permits a very easy support construction for the tree.

The present invention is directed to a root 1a and rootball 3 of a tree 1 placed into a hole 2 which is formed in the ground. Block fragments 4 are circumferentially positioned around the root 1a of the tree 1. A root winding band is at least twice or more wrapped around the fragments 4 and is additionally tensioned by a tension rope along the circumference of the rootball 3 by using a winch 12. Striking members are positioned into the hole. Soil and the like is used to bury the root 1a and rootball 3 in the ground. The present invention permits the support construction of the tree 1.

When the tension rope is pulled through the winch, the tension rope supports the rootball 3 and the tension force of tension rope functions to allow said root band to be press attached against the root 1a of the tree 1.

As the root band is wound at least twice or more, the press attaching force of the root band to the root 1a is not dispersed and the root band, having a good balance, supports the root 1a with a press attachment. The insertion of block fragments 4 between the root 1a and the root band prevents direct biting of the root band into the root 1a. Additionally, the winch 12 allows the tension rope to be easily tensioned with one adjustment.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

The following are embodiments of the present invention illustrated with reference to the attached schematic drawings.

Initially, as illustrated in FIG. 1, a root 1a and rootball 3 of a tree 1 are positioned into the hole 2 in the ground.

Figure 2A:
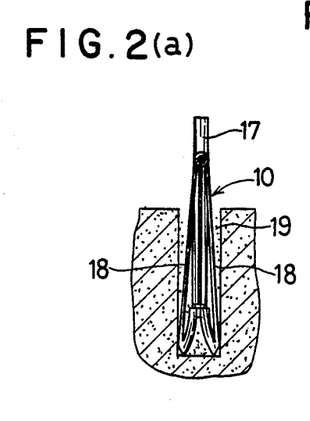
FIG. 2(a) illustrates a striking-in process of an anchor in a schematic sectional view wherein the anchor is incorporated into a vertical hole.
Figure 2B:
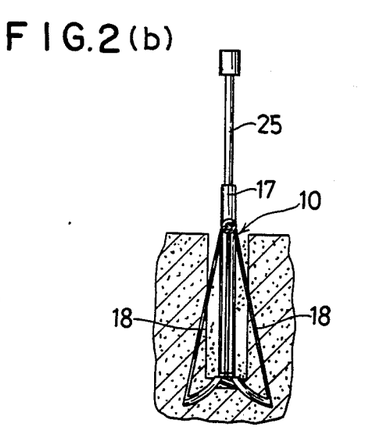
FIG. 2(b) is a schematic sectional view of the anchor resistor in an extended position.

Next, as illustrated in FIG. 2(a), a guide pipe 17 is mounted onto the anchor 10 having two resistor boards 18 which can be open. A vertical hole 19 is formed in the bottom surface of the hole 2. Thereafter, the guide pipe 17 is struck by using a root hammer 25 to spread the resistor boards 18 to bite into the soil of the hole bottom to securely fix the anchor 10. Thus, the anchor 10 is prestruck into the hole 2.

Figure 3:
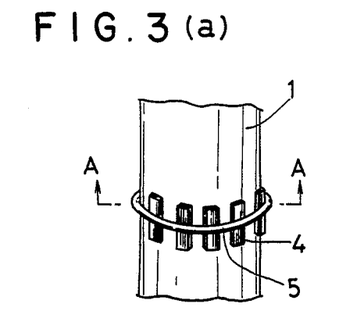
FIG. 3(a) is a perspective view of the mounting of the block fragments and ring.
FIG. 3(b) is a sectional view taken along line A—A of FIG. 3(a)
Figure 4:
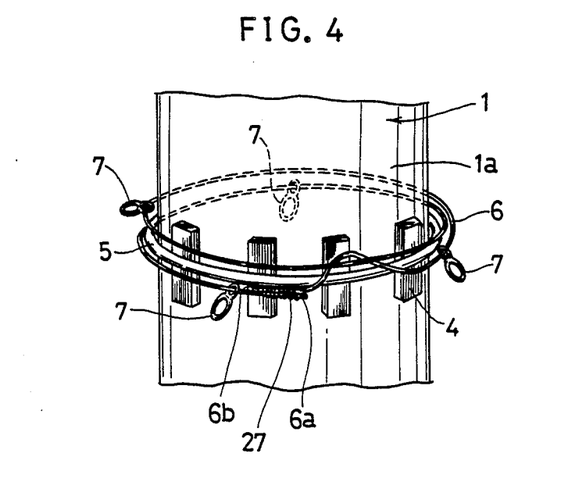
FIG. 4 is a perspective view illustrating the mounting of a wire on the three stem.

Next, as illustrated in FIG. 3, a plurality of block fragments 4 (total 10 pieces) comprising hypo-expanded urethane containing glass fibers, are positioned around the circumference of the root 1a of the tree 1. A rubber ring 5 surrounds the block fragments 4. Thereafter, as illustrated in FIG. 4, a securing member or a root wire 6 is wound around the block fragments 4. The wire 6 may be twice wound around the tree 1, once passing the second wire winding under the first wire winding to attach the wires to the tree 1. Both ends 6a and 6b of root wire 6 are fixed by using studs 27. In FIG. 4, ring studs 7 are mounted onto the winding wire 6 and are approximately spaced at four positions.

Figure 5A:
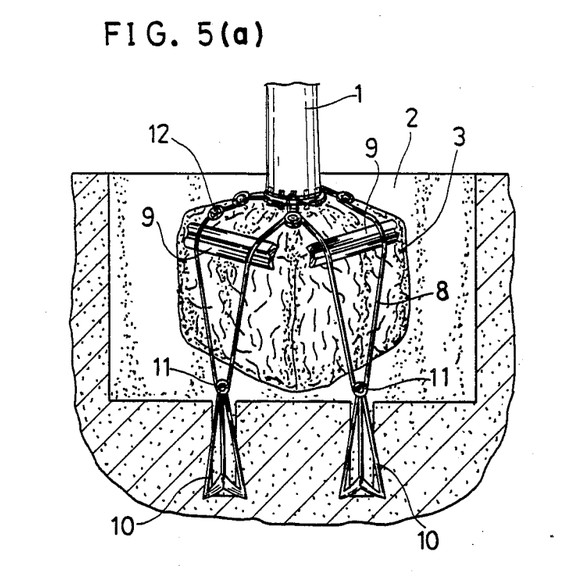
FIG. 5(a) is a schematic perspective view illustrating a winding of the tension wire.
Figure 5B:
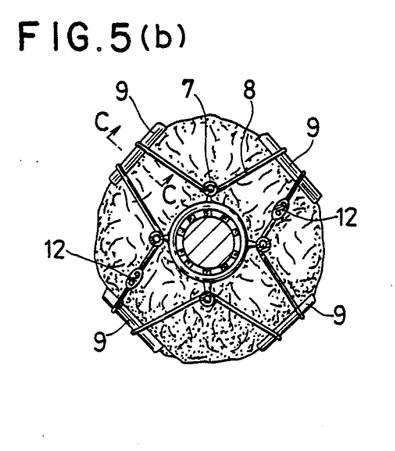
FIG. 5(b) is a schematic plan view of FIG. 5(a)

Next, one piece of the tension wire 8 is separated from the root wire 6 and is placed through the studs 7 mounted onto the root wire 6 around the circumference of rootball 3. As illustrated in FIGS. 5(a) and 5(b), with an insertion of an L-shaped synthetic resin illustrated in FIG. 5(c) between the wire 8 and the prescribed four positions of the shoulder 3a of rootball 3, the wire 8 is then sequentially put through rings 11 of the anchor 10. Thereafter, both ends 8a and 8b of the wire 8 are mounted on the winches 12. The detailed illustration of a winch 12 is set forth in FIG. 6. On end 8a of the tension wire 8 is wound around the pin 13 mounted onto one end of the winch 12. Another end 8b is placed through the hole 15 of the winding 14 mounted onto another end of the winch 12. Two winches 12 are mounted on diagonal lines of the tension wire 8, as illustrated in FIG. 5(b) for balancing the tension of tension wire 8.

Figure 6A:
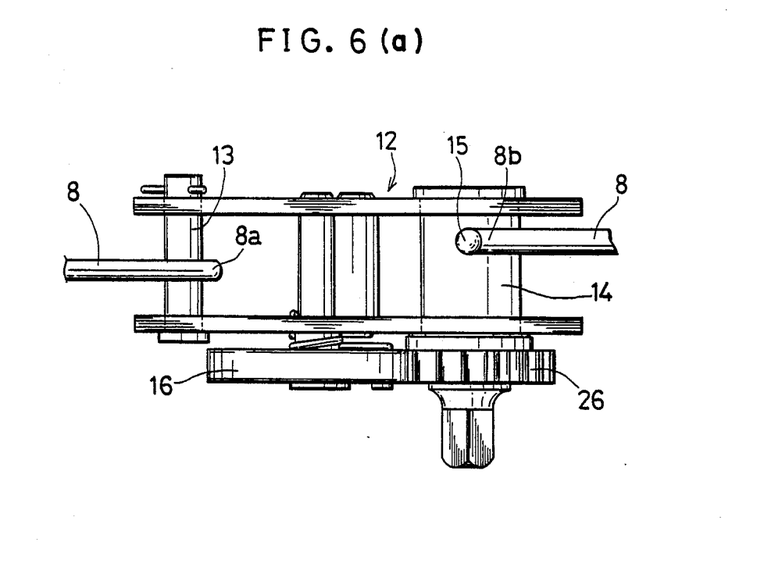
FIG. 6(a) is a plan view of a winch.
Figure 6B:
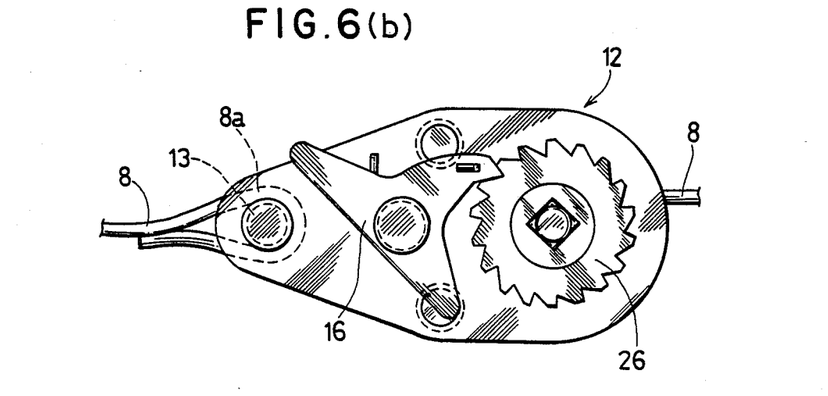
FIG. 6(b) is a side view of the winch illustrated in FIG. 6(a)

Under these conditions, operating handle 16 of the winch 12 rotates winding 14 via ratchet 26. Thereby another end 8b of tension wire 8 placed through the hole 15 is gradually wound around the winding 14. This generates tension in the tension wire 8 and the tension not only supports the rootball 3, but also operates on the root wire 6, causing the root wire 6 to be press attached to the root 1a of the tree 1. Further, the tension permits the root 1a to be supported with press attachement of the root wire 6.

In this case, insertion of the block fragments 4 between the root wire 6 which is wound around the circumference of tree 1 and root 1a prevents direct biting of the root wire 6 into the tree 1 which would lead to damage to the tree 1. Twice winding the root wire 6 prevents press attaching force dispersion of the root wire 6 to the tree 1. Tension of the tension wire 8 can easily be performed with ease by using the winch 12.

Figure 5C:
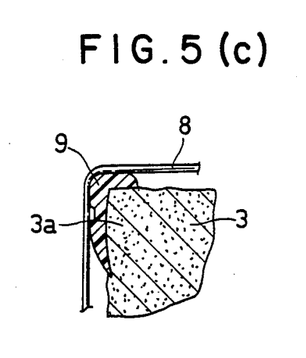
FIG. 5(c) is a schematic enlarged sectional view taken along line C—C of FIG. 5(b)

Additionally as a T-shaped protection pat 9 is inserted, along the shoulder 3a of the rootball 3, between the rootball 3 and tension wire 8, tension of the tension wire 8 provides the rootball side of the protection 9 with force. Therefore, a protection pat 9 is securely inserted, without shifting, between the rootball 3 and tension wire 8 to prevent biting of the tension wire 8 into the rootball 3.

Figure 7:
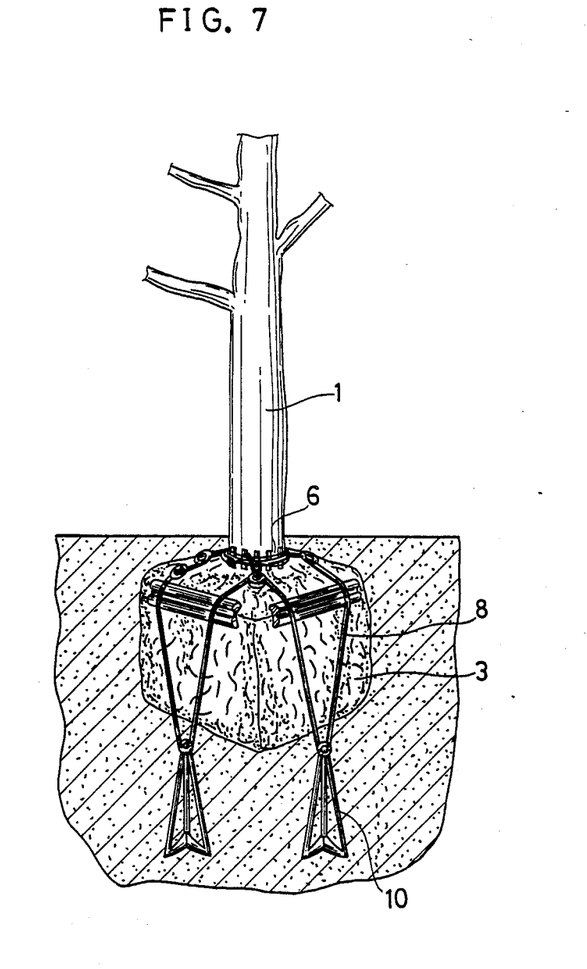
FIG. 7 is a schematic perspective view of support construction mounted on a tree.

Thus, after supporting the root 1a of the tree 1, as illustrated in FIG. 7, the support construction of the tree 1 is completed by filling up the hole 2 with soil.

If root 1a of the tree 1 grows, sequentially removing the block fragments 4 inserted between the root 1a and root wire 6 makes it possible to weaken the press attaching force of the root wire 6. Thus, the press attaching support in accordance with the growth of the tree 1 can be accomplished.

In support force tests of a tree constructed according to the aforementioned method, the following results were obtained.

|  | Zelkova | Camphor | Average |
| --- | --- | --- | --- |
| Two leg guard frame combination (well crib type) | 550 | 600 | 520 |
| Cross shaped guard frame strut | 480 | 450 |  |
| The embodiment | 1100 | 800 | 950 |

In the table above, the unit of measurement of the numerals is kg. The testing method consists of pulling down a tree such a zelkova, camphor mentioned above having a height of approximately 3 m from the ground, using a wrecker truck. The tree is regarded to be tipped when the tree tilts by approximately 70 degrees. Thereafter, the necessary tensile force is measured.

The measurement results show that the support force of trees constructed in the embodiments mentioned above have greatly increased.

In the embodiment mentioned above, the root wire 6 is wound twice around the root 1a of the tree 1. However, the number of windings is not limited to twice, Triple, quadruple or more windings are also permissible. In short, at least twice or more windings are required.

Additionally, the material quality of the block fragments 4 inserted between the root wire 6 and the tree 1 and root 1a is not limited to hypo-expanded urethane containing glass fibers according to the above embodiment. Material, such a hypo-expanded urethane, which is not only light in weight and will not damage the tree 1, but also having corrosion-resistance quality may be used. There is also no limitation of the number of block fragments 4 to be inserted.

Additionally, in the embodiment, applying materials having resistors 18 that can be open to anchor 10 saves labor and makes the striking operation very easy. Thus, a favorable result is achieved. However, the types of the anchor 10 are never limited to this construction. The application of strike members such a piles made of wood as the anchor is permissible. In short, it is necessary to apply members which can be struck into the ground and can be connected to the tension wire 8.

Additionally, in the embodiment, a T-shaped protection pat 9 may be inserted between the shoulder of the rootball 3 and the tension wire 8. A favorable effect is achieved wherein no shift occurrence was achieved. As the protection pat 9 comprises synthetic resin, it has an advantage of corrosion resistance. However, the shape and material quality of the protection pat 9 are not limited to this material and shape. Further, the protection pat 9 itself is not always necessary to the present invention.

Additionally, in the embodiment, before winding a root wire 6, the tree 1 is encircled with a rubber ring 5 and then the block fragments 4 are inserted between the rubber ring 5 and tree 1 to temporarily fix the block fragments 4. This achieves a favorable effect wherein more of the root wire 6 can be easily wound. Direct winding of the root wire 6 around the tree 2 and the root 1a via block fragments 4 is also permissible. Therefore, it is not an inevitable condition to temporarily fix fragments 4, using a rubber ring 5. However, it is permissible to temporarily fix block fragments 4, by using a rubber ring 5, and thereafter, remove the rubber ring 5 after the block fragments are temporary fixed or keep the rubber ring 5 for attachment without removal.

In the embodiment, block fragments 4 are directly arranged around the circumference of the tree 1 and the root 1a. However, a protection sheet can be inserted between the block fragments 4 and root 1a. In this case, there is an advantage that the press attaching force of the block fragments 4 to the tree 1 is reduced. Additionally, such sheets can be applied in place of the rubber ring 5 to temporarily fix the block fragments 4. In this case, covering block fragments 4 with a sheet makes it possible to acquire an advantage of a favorable appearance.

Additionally, there is no question as to sequences to strike in the anchor 10. The striking is allowable both before and after a root wire 6 is wound around the tree 1 and the root 1a.

Additionally, for the material quality of the root wire 6, for example, metal such as stainless and synthetic resin such a polyvinyl chloride are also permissible. There is no question as to the various material which may be used.

As well, there is no question as to the material quality of the tension wire 8.

As the present invention has the features mentioned above, its method makes possible these excellent advantages:

(a) As a root band is wound at least twice or more around the tree root, the press attaching force of the root band to a tree root, generated by the tension of the tension rope, is not dispersed. This construction is different from the conventional method and it operates with a good balance to a three root to secure the press attaching support.

(b) Additionally, the at least two windings of root band prevents dispersion of the press attaching force, preparation of plural (four pieces) root bands is not required. Therefore, the operation efficiency can remarkably be improved compared with a conventional method.

(c) Additionally, insertion of block fragments between the root band and tree root eliminates conventional direct biting of the root band into the tree root. Therefore, careless damage of the tree is prevented and oxygen absorption from the bark is never hindered.

(d) Additionally, as the tension rope can be tensed, using a winch, winch operation allows tension and loosening of tension rope and press attaching support of root band to a tree root to be very easily performed with a single operation.

(e) Adjustment of winch tightening allows support force of tension rope to a rootball and press attaching force of root band to a tree root to be optionally adjusted in accordance with the growth of tree root and trunk.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method for positioning and supporting a tree having a tree stem and a rootball comprising the following steps:
   forming a hole in a ground surface;
   positioning anchors within said hole;
   positioning block fragments around said tree stem;
   wrapping a securing member around said block fragments and said tree stem for securing said block fragments to said tree stem;
   positioning said rootball within said hole;
   mounting a tension member to said securing member and said anchors;
   securing a tightening member to said tension member for adjusting the tension of said tension member for retaining said tree within said hole; and
   burying said rootball positioned within said hole.

2. The method according to claim 1, wherein said securing member is at least twice wound around said block fragments and said tree stem.

3. The method according to claim 1, wherein said securing member is a wire.

4. The method according to claim 1, wherein said anchors include resistance boards for engaging the ground within said hole for retaining said anchors within said hole.

5. The method according to claim 1, and further including the step of positioning protective pads on said rootball adjacent to said tension member for preventing damage to said rootball.

6. The method according to claim 1, wherein said tension member is a wire.

7. The method according to claim 1, wherein said tightening member is a winch having a first end connected to a first end of said tension member and a second end connected to a second end of said tension member for adjusting the tension of said tension member.

8. The method according to claim 1, and further including ring studs for mounting said tension member relative to said securing member.

* * * * *

UNITED STATES PATENT AND TRADEMARK OFFICE
CERTIFICATE OF CORRECTION

PATENT NO. : 4,894,950
DATED : January 23, 1990
INVENTOR(S) : Yukio KIDA and Haruto KOBAYASHI It is certified that error appears in the above-identified patent and that said Letters Patent is hereby corrected as shown below:

Title Page, under Category [73] Assignee: change

"Toho Perlite Kabushiki Kaisha, Tokyo, Japan" to

-- Toho Perlite Kabushiki Kaisha, Osaka, Japan, and
Kabushiki Kaisha Tokyo Landscape Architects, Tokyo, Japan --

Signed and Sealed this

Twenty-sixth Day of April, 1994

Attest:

BRUCE LEHMAN

*Attesting Officer*      *Commissioner of Patents and Trademarks*